(12) United States Patent
Goss et al.

(10) Patent No.: US 11,748,277 B2
(45) Date of Patent: Sep. 5, 2023

(54) CLIENT INPUT/OUTPUT (I/O) ACCESS RATE VARIATION COMPENSATION

(71) Applicant: Seagate Technology LLC, Cupertino, CA (US)

(72) Inventors: Ryan James Goss, Prior Lake, MN (US); David W. Claude, Loveland, CO (US); Graham David Ferris, Savage, MN (US); Daniel John Benjamin, Savage, MN (US); Ryan Charles Weidemann, Victoria, MN (US)

(73) Assignee: Seagate Technology, LLC, Cupertino, CA (US)

( * ) Notice: Subject to any disclaimer, the term of this patent is extended or adjusted under 35 U.S.C. 154(b) by 79 days.

(21) Appl. No.: 16/810,357

(22) Filed: Mar. 5, 2020

(65) Prior Publication Data
US 2021/0279188 A1 Sep. 9, 2021

(51) Int. Cl.
*G06F 13/16* (2006.01)
*G06F 11/30* (2006.01)
*G06F 11/34* (2006.01)
*G06F 12/02* (2006.01)

(52) U.S. Cl.
CPC ...... *G06F 13/1668* (2013.01); *G06F 11/3034* (2013.01); *G06F 11/3485* (2013.01); *G06F 11/3495* (2013.01); *G06F 12/0253* (2013.01); *G06F 2212/1044* (2013.01)

(58) Field of Classification Search
CPC ............. G06F 13/1668; G06F 11/3034; G06F 11/3485; G06F 11/3495; G06F 12/0253
See application file for complete search history.

(56) References Cited

U.S. PATENT DOCUMENTS

| | | | |
|---|---|---|---|
| 7,558,905 B2 | 7/2009 | Sinclair et al. | |
| 8,341,300 B1 | 12/2012 | Karamcheti et al. | |
| 8,706,940 B2 | 4/2014 | Chirca et al. | |
| 8,725,931 B1* | 5/2014 | Kang .................. | G06F 13/1642 |
| | | | 711/103 |
| 8,880,775 B2 | 11/2014 | Stefanus et al. | |
| 8,918,595 B2 | 12/2014 | Ebsen | |
| 9,645,769 B2 | 5/2017 | Chadha et al. | |

(Continued)

FOREIGN PATENT DOCUMENTS

CN 102147767 8/2011

*Primary Examiner* — Tim T Vo
*Assistant Examiner* — Phong H Dang
(74) *Attorney, Agent, or Firm* — Hall Estill Law Firm; Randall K. McCarthy

(57) ABSTRACT

Method and apparatus for enhancing performance of a storage device, such as a solid-state drive (SSD). In some embodiments, the storage device monitors a rate at which client I/O access commands are received from a client to transfer data with a non-volatile memory (NVM) of the storage device. A ratio of background access commands to the client I/O access commands is adjusted to maintain completion rates of the client I/O access commands at a predetermined level. The background access commands transfer data internally with the NVM to prepare the storage device to service the client I/O access commands, and can include internal reads and writes to carry out garbage collection and metadata map updates. The ratio may be adjusted by identifying a workload type subjected to the storage device by the client.

19 Claims, 6 Drawing Sheets

(56) References Cited

U.S. PATENT DOCUMENTS

| | | | |
|---|---|---|---|
| 9,996,291 B1 | 6/2018 | Izhar et al. | |
| 10,739,996 B1* | 8/2020 | Ebsen | G06F 3/064 |
| 2014/0281127 A1 | 9/2014 | Marcu et al. | |
| 2017/0285945 A1* | 10/2017 | Kryvaltsevich | G06F 3/0659 |
| 2018/0189175 A1* | 7/2018 | Ji | G06F 3/0611 |
| 2018/0336150 A1* | 11/2018 | Jinn | G06F 13/26 |
| 2019/0026142 A1 | 1/2019 | Kato | |
| 2019/0050161 A1 | 2/2019 | Wysocki et al. | |
| 2019/0079697 A1* | 3/2019 | Suzuki | G06F 3/0679 |
| 2019/0258422 A1* | 8/2019 | Purkayastha | G06F 12/10 |
| 2020/0026465 A1* | 1/2020 | Jung | G06F 3/0673 |

* cited by examiner

DATA FLOW

METADATA (MAP) FORMAT

CLIENT INPUT/OUTPUT (I/O) ACCESS RATE VARIATION COMPENSATION

SUMMARY

Various embodiments of the present disclosure are generally directed to a method and apparatus for enhancing performance of a storage device, such as a solid-state drive (SSD).

In some embodiments, the storage device monitors a rate at which client I/O access commands are received from a client to transfer data with a non-volatile memory (NVM) of the storage device. A ratio of background access commands to the client I/O access commands is adjusted to maintain completion rates of the client I/O access commands at a predetermined level. The background access commands transfer data internally with the NVM to prepare the storage device to service the client I/O access commands, and can include internal reads and writes to carry out garbage collection and metadata map updates. The ratio may be adjusted by identifying a workload type subjected to the storage device by the client.

These and other features and advantages which characterize the various embodiments of the present disclosure can be understood in view of the following detailed discussion and the accompanying drawings.

DETAILED DESCRIPTION

Figure 1A:
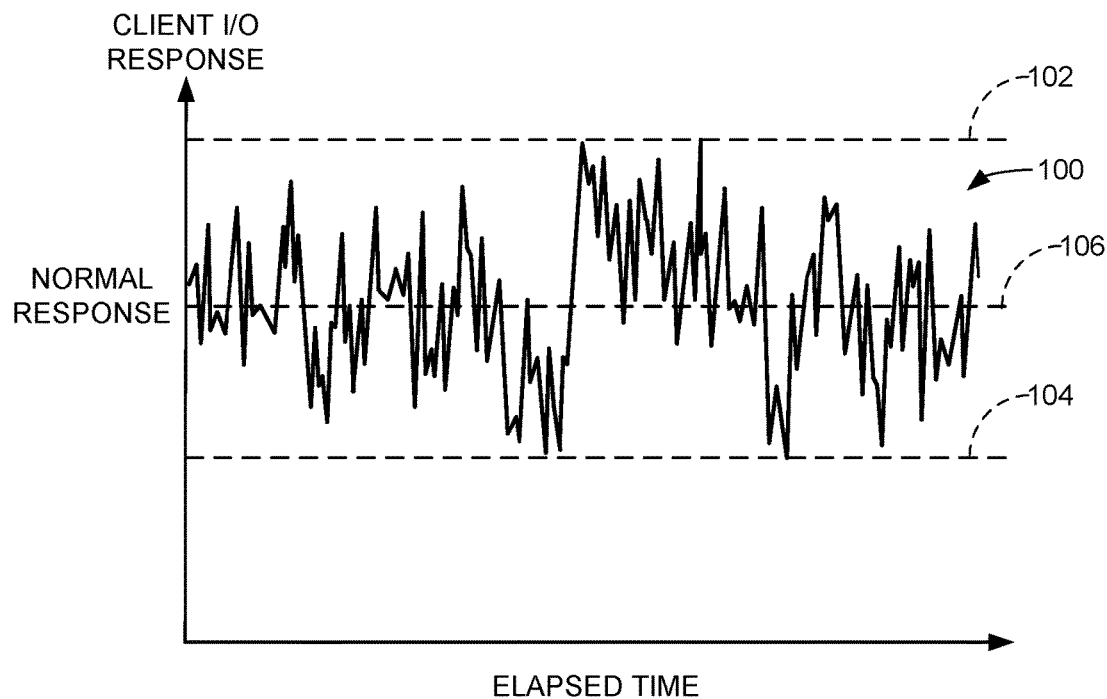
FIGS. 1A and 1B are graphical representations of client input/output (I/O) responses obtained during normal and compensated modes of a storage device constructed and operated in accordance with various embodiments of the present disclosure.

The present disclosure generally relates to systems and methods for managing data I/O performance of a data storage device, such as but not limited to a solid-state drive (SSD).

Storage devices generally include a controller and non-volatile memory (NVM). The controller communicates with a host (client) device to manage the storage and retrieval of user data to and from the NVM. Solid-state drives (SSDs) are one form of storage device that use solid-state semiconductor memory, such as NAND flash, to store the user data. The flash is often arranged as a number of flash semiconductor dies that are accessible via channels (lanes). NAND flash and other forms of erasable memories usually require an intervening erasure operation before new data can be stored to a selected location.

It is generally desirable to provide a client with consistent data transfer rate performance. In modern usage applications, it has been found better to maintain steady-state performance by a storage device in processing client data transfer commands (e.g., read commands, write commands, etc.), than to provide the client with transfers at widely varying higher and lower levels. This is true for both periods of deterministic and non-deterministic operation. Deterministic operation generally relates to the drive guaranteeing a specified minimum level of performance for a selected period of time.

There are three main processes that can affect client data transfer performance (also referred to as client I/O access performance). These three processes are often interrelated.

The first process relates to the rate at which the client data transfer commands are presented to the storage device. It is presumed that in most enterprise environments, a sustained high level of command issuance will usually be presented in order to maximize utilization of the system. Nevertheless, the type of workload presented by the client (e.g., write or read dominated, sequential or random accesses, etc.) can significantly affect the ability of the storage device to maintain a consistent level of performance for the client.

The second process relates to background garbage collection (GC) operations that are carried out to free up new storage space to accommodate new client data. A GC operation may include locating and moving current version data to a new location, followed by erasing the location to return the location to service. GC operations are often carried out on garbage collection units (GCUs), which are multi-block sections of memory that are allocated and erased as a unit. The rates at which GC operations are carried out are at least partially a function of the extent to which write commands to write new client data are being supplied to the storage device. GC operations can also be carried out in highly repetitive read environments to relocate data due to read disturb effects.

The third process relates to background map updates. A map metadata structure such as a flash transition layer (FTL) is maintained by the controller to track the locations of all current version data blocks in the system. The map metadata may be managed for different segments of memory in the form of periodic snapshots and intervening journal updates. The updates list the changes to the most recent snapshot. The number and rate of updates will be a function of the rate at which new client data are presented for storage, as well as the extent to which data are relocated internally during GC operations. Other forms of background operations may be carried out as well, so the foregoing list is not necessarily exhaustive.

It follows that storage devices with erasable memories can have a significant background processing overhead. The controller not only operates to service pending client read and write commands, but also performs background reads and writes to support the GC operations to free up space for new data, as well as background reads and writes to maintain an accurate map structure.

Various embodiments of the present disclosure are generally directed to an apparatus and method for enhancing client data transfer rate performance in a storage device, such as but not necessarily limited to a solid-state drive (SSD).

As explained below, some embodiments generally involve monitoring a rate at which client I/O data transfer (access) commands are presented to transfer data between a client and a non-volatile memory (NVM). A ratio between the client I/O access commands and internal data transfer (access) commands is adjusted to maintain completion times of the client I/O access commands at a predetermined acceptable level.

In some cases, an incrementing mechanism can be used to adjust, for each of a succession of time intervals, a first number of the internal access commands and a second number of the client I/O access commands that are to be performed over each interval. In further cases, a workload type is identified from the client I/O data transfer commands, and adjustments to the ratio are made in relation to the identified workload type.

The system can operate to monitor and meter the rate at which background reads are scheduled (e.g., garbage collection (GC) reads, map reads, etc.). At any given time, the controller of the storage device may be presenting both client reads and background reads into a data command processing pipeline for scheduling and execution by the NVM (e.g., flash). By monitoring both client reads and the required background reads, the number of background reads can be increased or decreased to maintain the desired observed client read performance. This operation may be upstream of a write scheduler operation, which in turn balances host writes v. background writes as well as the appropriate mixture of writes and reads that are ultimately fed to the NVM electronics.

One difference between client reads and client writes is that, generally, a client is waiting for the returned data from a completed read command, and so delays in executing client read commands can directly impact client performance. By contrast, writeback caching and other techniques can be used to provide the client with a command completion notification even if the client write data have not yet been stored in the final target location, thus allowing the client to move on to new tasks while the storage device schedules the write operation in the near future.

With regard to adjusting background writes (e.g., GC writes, map data writes, etc.), the system further operates in some embodiments to monitor host workload and develop a function that speeds up or slows down the rate at which the background writes are carried out. In the particular case of a GC background operation, because both GC reads and writes are (usually) needed to complete the GC operation, a GC read needs to take place before the corresponding GC write can be carried out.

Once the correct ratio of reads (client v. background) have been queued, the reads, along with the writes, are forwarded to an I/O scheduler. This circuitry may form a portion of the NVM in the form of front end flash electronics, although other arrangements can be used. The scheduler selects an appropriate ratio of client to background writes as well as the correct mix of reads and writes. Further operations can take place as well, such as the allocation of cache memory, the allocation of available buffers to support the different access operations, and so on.

In some cases, the scheduler may select an appropriate ratio of host writes to GC writes over some future count (e.g., of the next X writes, Y will be host writes and Z will be GC writes). Other arrangements can be used.

Multiple rates may be used, such as two rates (a faster GC rate and a slower GC rate). Factors that can be used include selecting the faster rate at times of low host I/O or when R/W and high demand is present, and selecting the slower rate in a read dominated environment. Other factors can be used as well; for example, using a slower rate enhances data retention, while going faster can compensate for high read error rates, etc.

As noted above, command completion time is not necessarily an optimum metric for writes since the storage device can adjust when command completions are reported and can carry out the host writes at a subsequent time. However, in some embodiments reported command completion time (for either or both reads and writes) can be used to reduce variability. Other system parameters, such as buffer utilization, can be used to further adjust write-side performance.

These and other features and advantages of various embodiments can be understood beginning with a review of FIG. 1A which provides a graphical representation of a response curve 100. The curve 100 represents a typical client input/output (I/O) response by an exemplary data storage device in a normal (uncompensated) mode of operation. The response can be measured in a number of ways, such as completion rates to complete a sequence of client access commands (e.g., read commands, write commands, status commands, flush commands, etc.) issued by a client device to a data storage device. As such, the numbers can represent command completion times, the number of commands completed over successive intervals of time, or any other suitable metric useful in adjudging storage device performance as observed from the client standpoint.

A significant amount of variability is present in the client I/O response curve 100. A first upper threshold 102 represents a maximum response (such as faster performance) and a lower threshold 104 represents a minimum response (such as slower performance). Line 106 represents an average completion response level for the overall depicted interval.

It can be seen from a review of curve 100 that significant variations occur with respect to the overall range between the maximum and minimum levels (e.g., the vertical separation distance between lines 102 and 104). Further variations can be seen as "drifting" by the storage device over time as the performance successively trends up and down along different portions of the curve.

These and other forms of variations in client I/O response can be deleterious from a client standpoint, since the client may be involving multiple data exchanges with multiple devices as well as carrying out other computations to complete a larger task. In order for the upstream work to be completed in an acceptable manner, downstream performance of the storage device should normally be as consistent as possible over time.

Figure 1B:
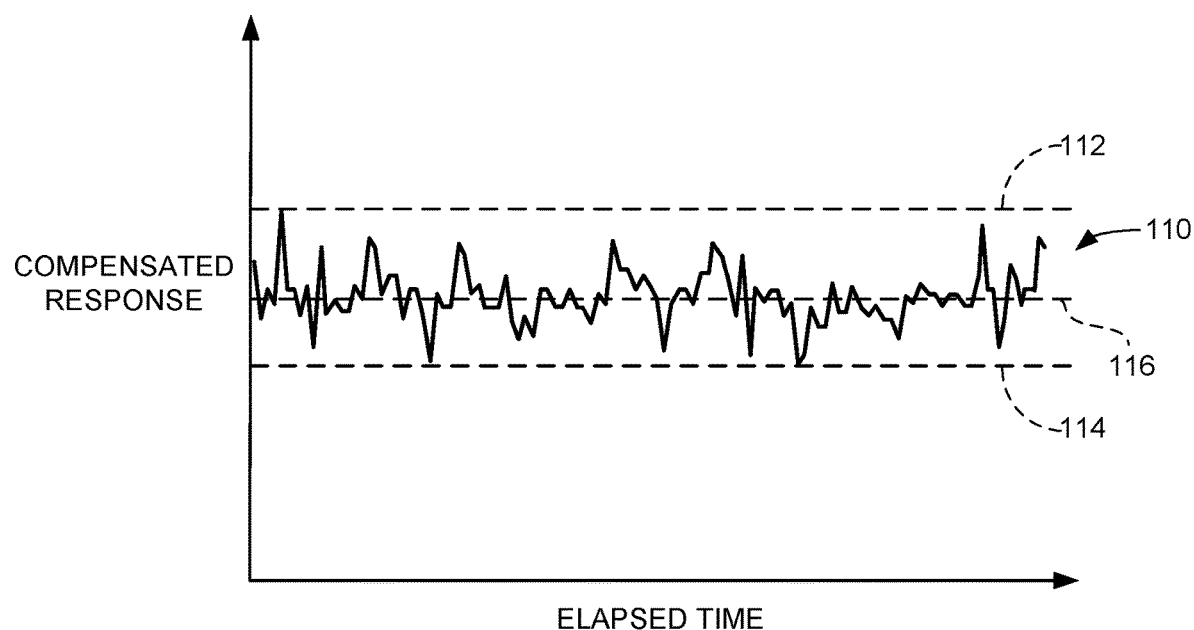

Accordingly, FIG. 1B shows another client I/O response curve 110. The curve 110 represents a client I/O response by the data storage device operated in a compensated mode of operation as variously embodied by the present disclosure. In some embodiments, the modes are selectable so that the same device can be configured to operate sometimes as in FIG. 1A and sometimes as in FIG. 1B. As before, the curve 110 represents completion rates for the associated client device.

An upper threshold 112 and lower threshold 114 mark maximum and minimum response levels over the depicted interval, and level 116 represents an average response rate for the curve. While the average level 116 in FIG. 1B may be somewhat lower than the average level 106 in FIG. 1A, the variations in the curve 110 are significantly reduced, leading to enhanced client performance.

Figure 2:
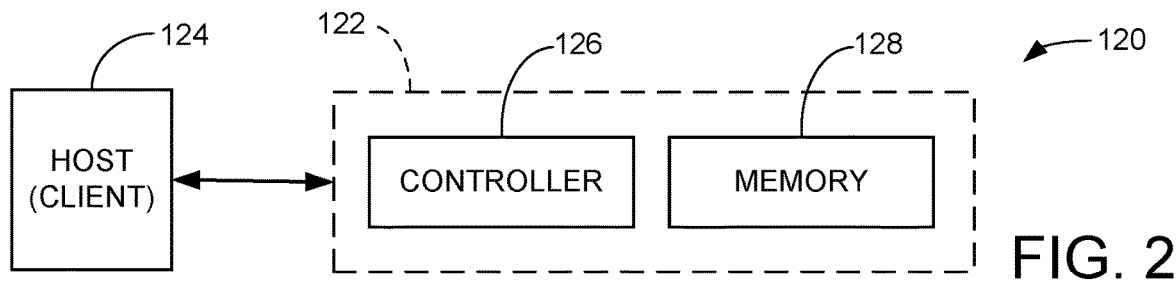
FIG. 2 is a functional block diagram of an exemplary storage device and client device.

FIG. 2 shows a data processing system 120 that includes a data storage device 122 coupled to a host (client) device 124 in accordance with some embodiments. The system 120 can be operated in accordance with the respective modes of FIGS. 1A and 1B as desired. The data storage device 122, also sometimes referred to as a storage device, includes a controller 126 and a memory 128. Generally, the controller 126 provides top level control to service access commands from the client device 124 to transfer data to and from the memory 128. The respective storage device 122 and client device 124 can take substantially any suitable form.

Figure 3:
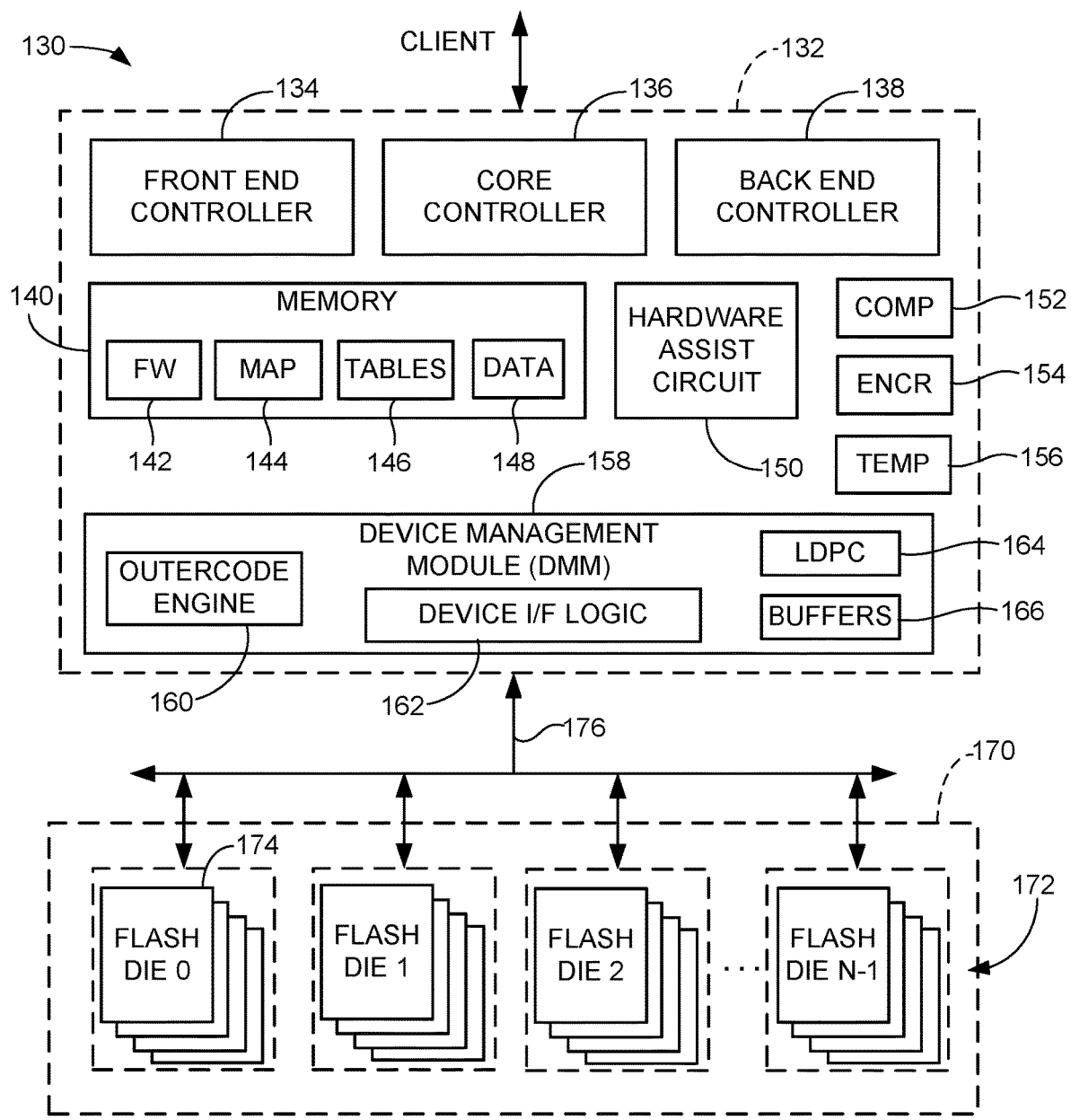
FIG. 3 shows a storage device characterized as a solid-state drive (SSD).

FIG. 3 is a functional block representation of another data storage device 130 in accordance with some embodiments. The storage device 130 corresponds to the storage device 122 in FIG. 2 and is characterized as a solid-state drive (SSD) which communicates with one or more client devices 124 via one or more Peripheral Component Interface Express (PCIe) ports. The SSD is contemplated as utilizing 3D NAND flash memory as the main memory store (e.g., memory 128), although other forms of memory can be used.

In at least some embodiments, the SSD operates in accordance with the NVMe (Non-Volatile Memory Express) specification, which enables different users to allocate NVM sets (die sets) for use in the storage of data. Each die set may form a portion of an NVMe namespace that may span multiple SSDs or be contained within a single SSD. Each NVMe namespace will be owned and controlled by a different user (owner). While aspects of various embodiments are particularly applicable to devices operated in accordance with the NVMe Standard, such is not necessarily required.

The SSD 130 includes a controller circuit 132 that corresponds to the controller 126 in FIG. 2. The controller circuit 132 has a front end controller 134, a core controller 136 and a back end controller 138. The front end controller 134 performs host OF functions, the back end controller 138 directs data transfers with the flash memory store and the core controller 136 provides top level control for the device.

Each controller 134, 136 and 138 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can alternatively be used. The various controllers may be integrated into a single system on chip (SOC) integrated circuit device, or may be distributed among various discrete devices as required.

A controller memory 140 represents various forms of volatile and/or non-volatile memory (e.g., SRAM, DDR DRAM, flash, etc.) utilized as local memory by the controller 132. Various data structures and data sets may be stored by the memory including loaded firmware (FW) 142, map data 144, table data 146 and user data 148 in read/write buffers temporarily cached during host data transfers.

A non-processor based hardware assist circuit 150 may enable the offloading of certain memory management tasks by one or more of the controllers as required. The hardware circuit 150 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in or adjacent the controller 132, such as a data compression block 152, an encryption block 154 and a temperature sensor block 156. These elements can be realized using hardware/firmware as required. The data compression block 152 applies lossless data compression to input data sets during write operations to enhance storage efficiency. It is contemplated albeit not required that all of the user data supplied for storage by the SSD 130 will be compressed prior to storage to the flash memory.

The encryption block 154 applies suitable encryption and other cryptographic processing to provide data security for the SSD. The temperature block 156 may include one or more temperature sensors that monitor and record temperatures of the SSD during operation.

A device management module (DMM) 158 supports back end processing operations. An outer code engine circuit 160 generates outer code for parity sets stored by the SSD (discussed below). A device OF logic circuit 162 handles the transfers of the parity sets. A low density parity check (LDPC) circuit 164 generates and use LDPC codes as part of an error detection and correction strategy to protect the data stored by the SSD 110. Various buffers 166 are made available and are allocated as necessary to support various read and write operations for host I/O accesses, GC operations and map updates.

A memory module 170 corresponds to the memory 128 in FIG. 2 and includes a non-volatile memory (NVM) in the form of a flash memory 172 distributed across a plural number N of flash memory dies 174. Flash memory control electronics (not separately shown in FIG. 2) may be provisioned to facilitate parallel data transfer operations via a number of channels (lanes) 176.

Figure 4:
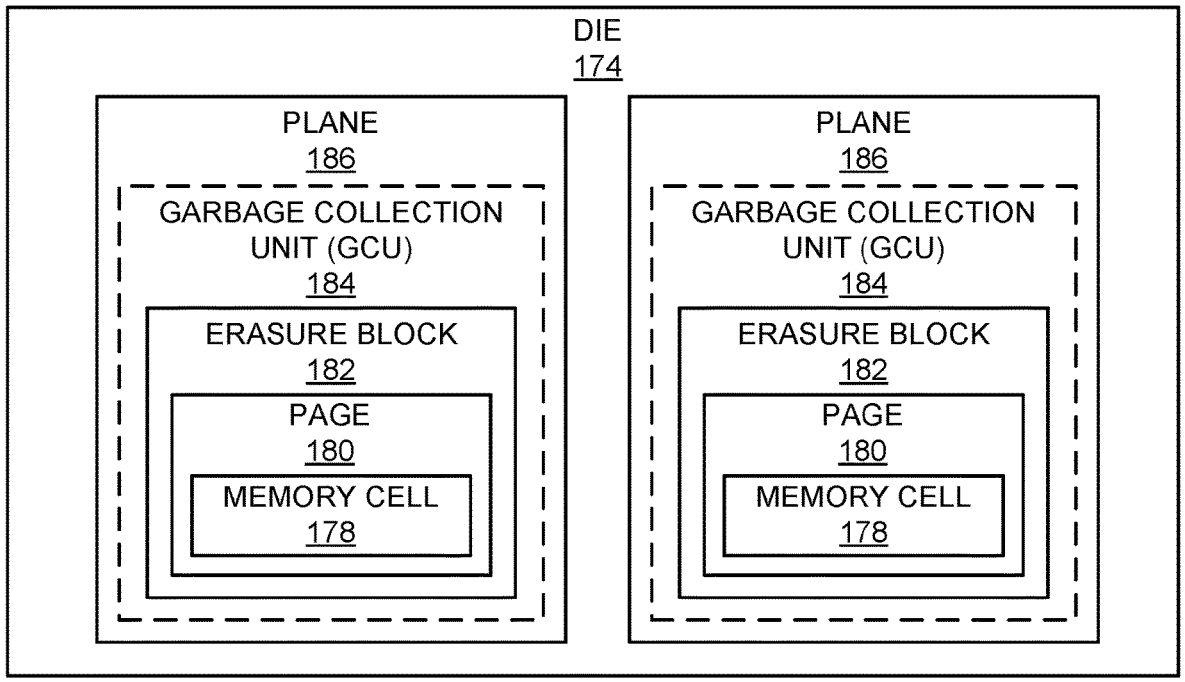
FIG. 4 shows a physical and logical layout of a flash die from FIG. 3 in some embodiments.

FIG. 4 shows a physical/logical arrangement of the various flash memory dies 174 in the flash memory 172 of FIG. 3 in some embodiments. Each die 174 incorporates a large number of flash memory cells 178. The cells may be arrayed in a two-dimensional (2D) or three-dimensional (3D stacked) arrangement with various control lines (e.g., source, bit, word lines) to access the cells.

Groups of cells 178 are interconnected to a common word line to accommodate pages 180, which represent the smallest unit of data that can be accessed at a time. Depending on the storage scheme, one or more pages of data may be written to the same physical row of cells, such as in the case of SLCs (single level cells with one bit per cell), MLCs (multi-level cells with two bits per cell), TLCs (three-level cells with three bits per cell), QLCs (four-level cells with four bits per cell), and so on. Generally, n bits of data can be stored to a particular memory cell 178 using $2^n$ different charge states (e.g., TLCs use eight distinct charge levels to represent three bits of data, etc.). The storage size of a page can vary; some current generation flash memory pages are arranged to store 32 KB (32,768 bytes) of user data plus associated LDPC code bits.

The memory cells 178 associated with a number of pages are integrated into an erasure block 182, which represents the smallest grouping of memory cells that can be concurrently erased in a NAND flash memory. A number of erasure blocks 182 are turn incorporated into a garbage collection unit (GCU) 184, which are logical storage units that utilize erasure blocks across different dies and which are allocated and erased as a unit.

During operation, a selected GCU is allocated for the storage of user data, and this continues until the GCU is filled. Once a sufficient amount of the stored data is determined to be stale (e.g., no longer the most current version), a garbage collection (GC) operation can be carried out to recycle the GCU. This includes identifying and relocating the current version data to a new location (e.g., a new GCU), followed by an erasure operation to reset the memory cells to an erased (unprogrammed) state. The recycled GCU is returned to an allocation pool for subsequent allocation to begin storing new user data. In one embodiment, each GCU 184 nominally uses a single erasure block 182 from each of a plurality of dies 174, such as 32 dies.

Each die 174 may further be organized as a plurality of planes 186. Examples include two planes per die as shown in FIG. 4, although other numbers of planes per die, such as four or eight planes per die can be used. Generally, a plane is a subdivision of the die 174 arranged with separate read/write/erase circuitry such that a given type of access operation (such as a write operation, etc.) can be carried out simultaneously by each of the planes to a common page address within the respective planes.

Figure 5:
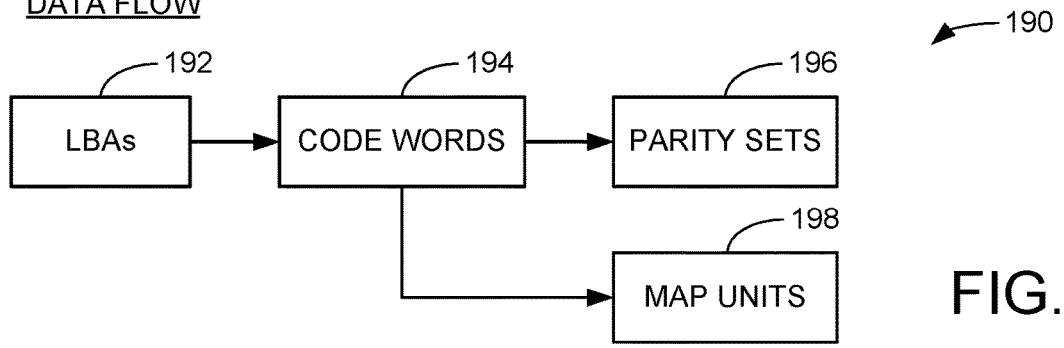
FIG. 5 illustrates a data flow for data stored by the SSD.

Input data from a client device such as 124 are stored in a manner such as illustrated by a data flow sequence 190 in FIG. 5. Other arrangements can be used. Blocks of data with associated logical addresses such as logical block addresses, LBAs, are presented at 192. The blocks are arranged into code words 194, which include user data bits and error correction code (ECC) bits to facilitate recovery during a read operation. The ECC bits may take the form of LDPC (low density parity check) bits.

A selected number of the code words may be arranged into pages, and a selected number of pages may in turn be arranged into parity sets 196. In one non-limiting example, 31 pages of code words are combinatorially combined to generate a parity value as a $32^{nd}$ page, and then all 32 pages of the parity set is written to a selected GCU. The combinatorial function can be an exclusive-or (XOR) or some other suitable function. The parity value operates as outer code. By using a GCU size of 32 erasure blocks with one erasure block from each die, the outer code can facilitate data recovery even in the instance of a single die failure (e.g., a RAID 5 configuration). Other outercode arrangements can be used, including multiple sets of parity values (e.g., RAID 6, 7, etc.).

For mapping purposes, groups of the code words 194 are arranged into map units 198. Map units represents groupings that enable the mapping system of the SSD to locate and retrieve the code words stored to the flash memory.

Figure 6:
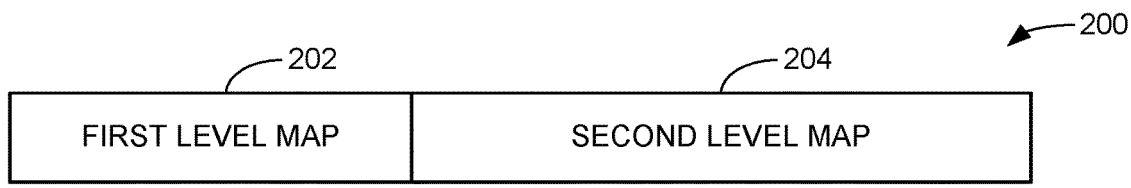
FIG. 6 is a format for map metadata used by the SSD.

A two level map 200 is represented in FIG. 6. Other mapping structures can be used including a single level map, a multi-level map with more than two levels, etc. The map 200 includes a first level map 202 and a second level map 204. The second level map 204 operates as a flash transition layer (FTL) with a physical to logical association of addresses to enable location of the desired user data blocks. The first level map 202 indicates the locations of map descriptors that in turn identify the locations of the map units 198 in the second level map 204. Some, most or all of the first and second level maps 202, 204 may be loaded to the local memory 140 for use by the controller 132 (see FIG. 2).

A typical data access sequence to service a client data access command may include accessing the first level map to identify the appropriate entry in the second level map, and accessing the second level map to identify the location in flash where the associated user data blocks are located. In the case of a read operation, the user data blocks are retrieved for further processing and return to the requesting client; in the case of a write operation, the new data blocks are written to a new location, and the metadata is updated. Maintaining accurate map metadata is generally necessary to enable the SSD 130 to accurately identify the current state of the system, and reliably service client access commands. Protection schemes such as error correction coding, redundant copies, etc. are applied to ensure the integrity of the map data.

Figure 7:
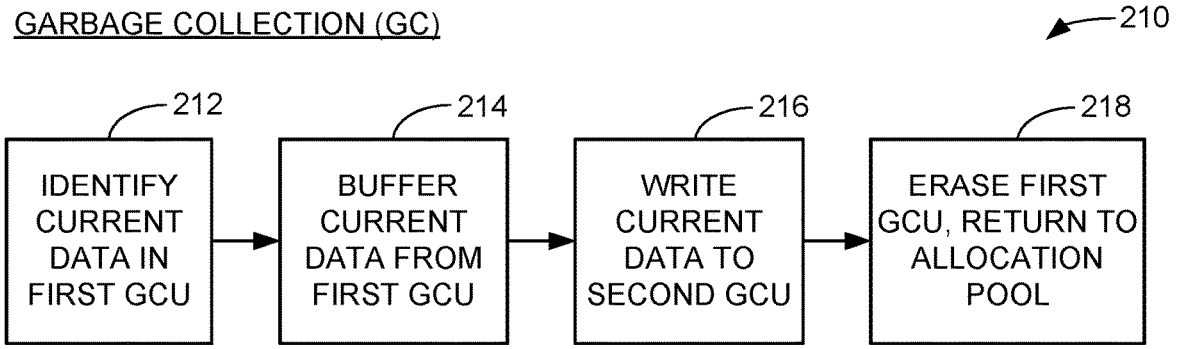
FIG. 7 is a sequence diagram for a garbage collection operation.

FIG. 7 is a sequence diagram 210 for a GC operation carried out by the SSD 130 in some embodiments. Other sequences can be used. During normal operation, newly presented data sets are written to the various GCUs. At some point during operation, a sufficient amount of data in a selected GCU (referred to in FIG. 7 as a first GCU) is determined to be stale. As such, the remaining current version data are identified in the first GCU, block 212. This can be carried out including through the use of a reverse directory map structure that is written to each GCU. The reverse directory, when used, can be arranged as the opposite of the FTL layer 204; that is, the reverse directory can provide a physical to logical listing of the blocks written to the associated GCU.

At block 214, the current data blocks are read from the first GCU and temporarily buffered. This transferred data is subsequently rewritten to a new location (second GCU) at block 216. Once the data have been confirmed as being safely written, the first GCU is subjected to an erasure operation to reset the flash memory cells and the erased first GCU is returned to an allocation pool awaiting allocation for the storage of new data, block 218.

It will be noted that the GC operation 210 thus includes one or more GC read operations to read out the current data, followed by one or more GC write operations to write the buffered data to the new GCU location. These are background reads that are carried out in addition to the normal reads and writes necessary to service the incoming client access commands.

Figure 8:
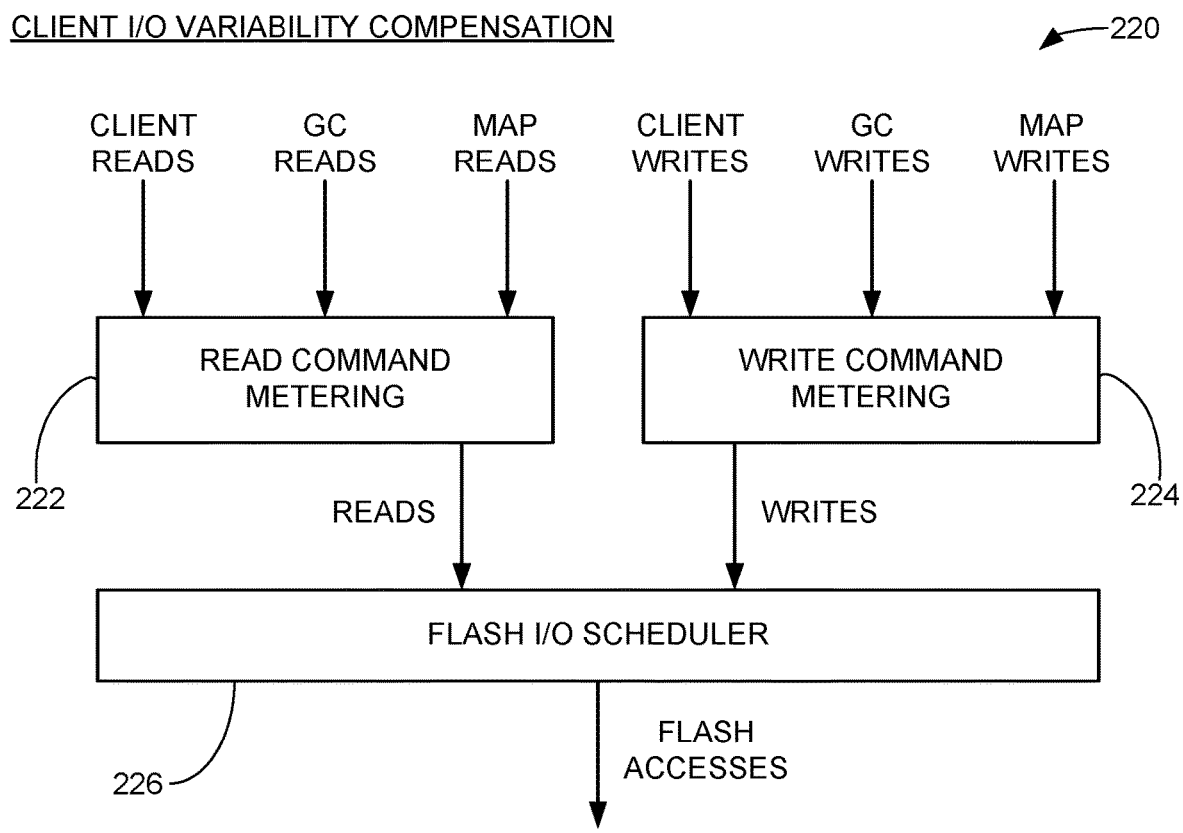
FIG. 8 shows client I/O variability compensation carried out by the SSD in some embodiments.

FIG. 8 shows a scheduling circuit 220 of the SSD 130 in accordance with some embodiments. From at least a functional standpoint, the scheduling circuit 220 includes a read command metering module 222, a write command metering module 224 and a flash I/O scheduler circuit 226. Other formats can be used, including formats where the functionality of the write command metering module 224 is incorporated into the flash I/O scheduler 226. While not limiting, at least the read command metering module 222 is incorporated into the controller circuit 132 and the flash I/O scheduler 226 is incorporated into the flash module 170 (see FIG. 3).

As shown in FIG. 8, the read command metering operation selects among at least three forms of reads: client reads, GC reads and map reads. As noted above, client reads are those reads that are carried out directly in response to service a requested read command from the client. The GC reads are carried out as described in FIG. 7, and the map reads are carried out to retrieve map metadata as described in FIG. 6.

In a similar fashion, the write command metering operation selects among at least three forms of writes: client writes, GC writes and map writes. The client writes are those provided by the client and are carried out to write client data to the flash. The GC writes relocate current data, and the map writes write updated map data (snapshots, map updates, reverse directory information, etc.) to the flash.

Ultimately, the SSD 130 operates to arrange a first ratio among the respective reads, a second ratio among the respective writes, and a third ratio of the reads and writes. These respective ratios can be selected in a number of ways. The final ratio is selected by the flash I/O scheduler 226 and issued to the various dies to perform the required accesses. Ultimately, the ratios are selected and adaptively adjusted during continued operation of the SSD 130 to obtain the compensated performance of the type depicted in FIG. 1B discussed above.

Figure 9:
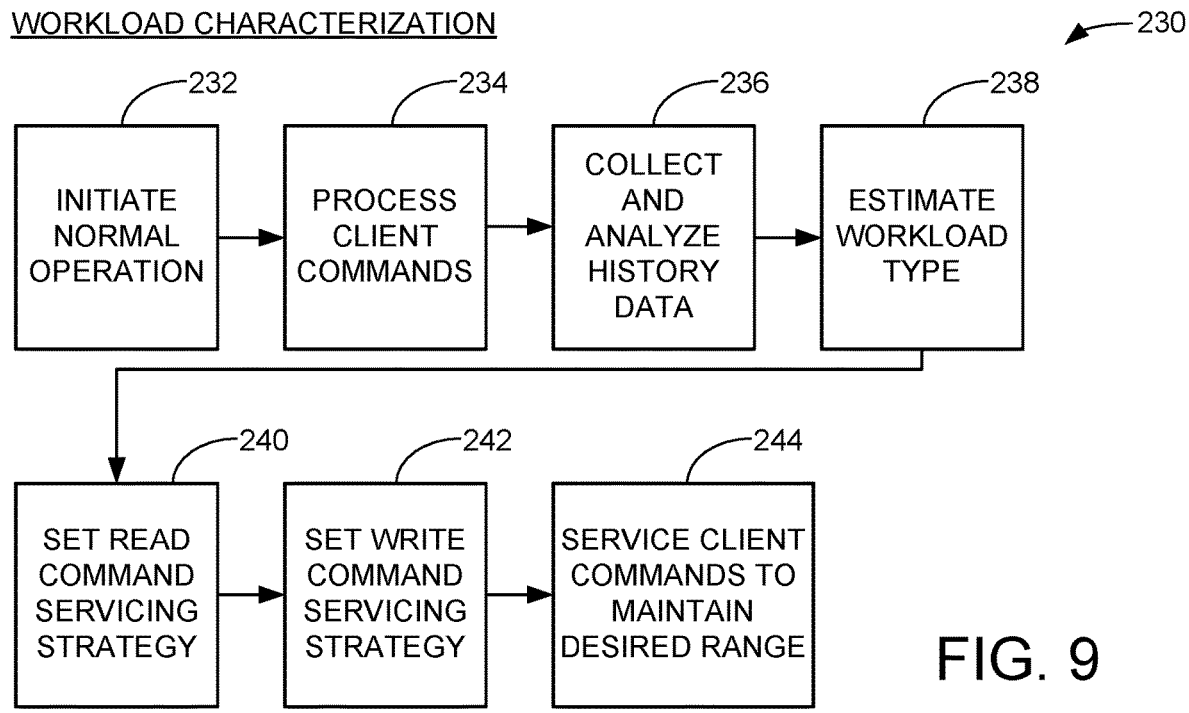
FIG. 9 is a sequence diagram to show workload characterization by the SSD in some embodiments.

FIG. 9 shows a sequence diagram for a workload characterization routine 230 carried out by the scheduling circuit 220 of FIG. 8 in some embodiments. The routine 230 operates to characterize an existing workload being presented to the SSD 130 by the client 124 in order to select appropriate strategies for setting the various ratios of commands. Normal operation of the SSD 130 is initiated at block 232, which results in the receipt and servicing of various client access commands, block 234. History data regarding the commands is collected and analyzed at block 236, from which an estimate is made of the current workload type being employed, block 238.

Once the current workload has been identified, the controller circuit 132 proceeds to establish an appropriate read command servicing strategy at block 240 and an appropriate write command servicing strategy at block 242. These strategies include the setting of the various read, write and read/write ratios from FIG. 8. Thereafter, the client and background commands are carried out using the identified strategies and client I/O response performance is monitored, block 244. From this, further changes are adaptively made as required to achieve the desired level of client performance.

Figure 10:
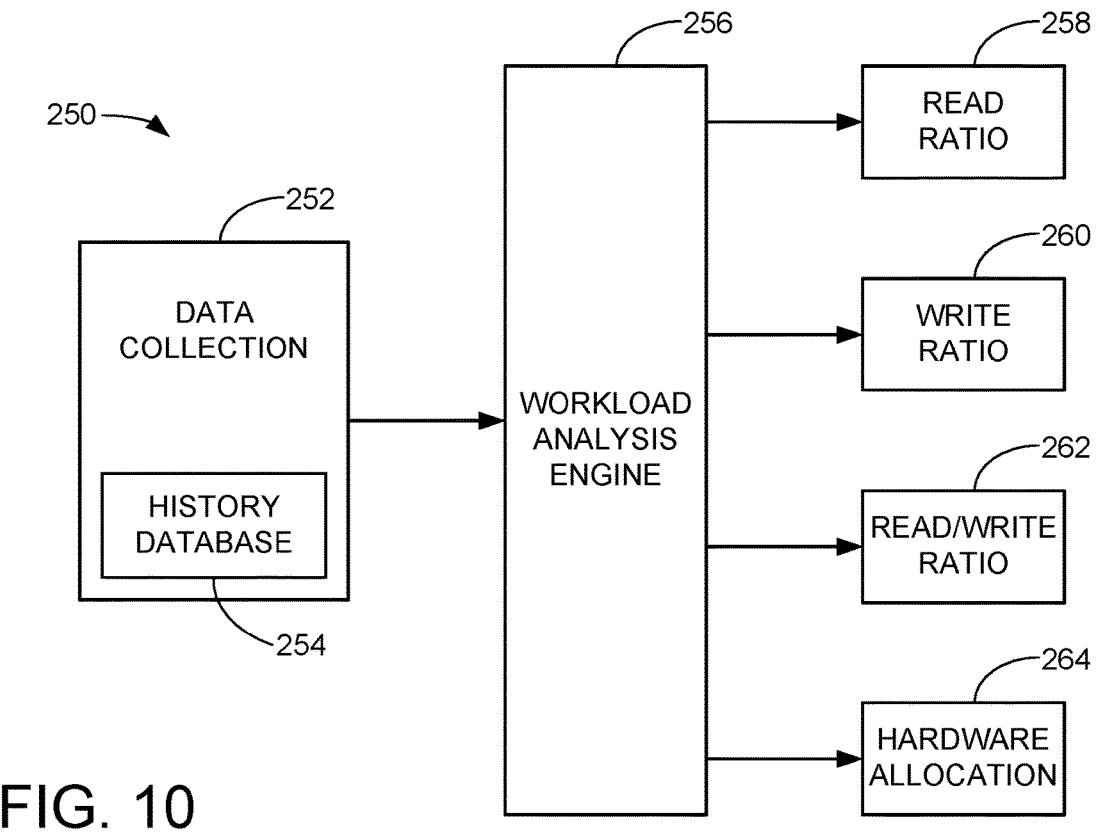
FIG. 10 shows a ratio manager circuit operative in some embodiments.

FIG. 10 shows a functional block representation of a ratio manager circuit 250 of the SSD 130 in accordance with some embodiments. The ratio manager circuit 250 can be incorporated into, or work in conjunction with, the scheduling circuit 220 of FIG. 8 in carrying out the workload characterization sequence of FIG. 9.

Generally, the ratio manager circuit 250 operates in the background to analyze and assess workload conditions for the SSD 130. To this end, a data collection module 252 collects history data based on a number of system inputs. These can include client commands, various measured parameters, access patterns, etc. The history data can be of any suitable form and gives insight into the needs of the system from the client standpoint. The accumulated history data are stored in a history database 254 as a data structure in memory.

A workload analysis engine 256 uses the history data from the database 254 to characterize client workload trends. Without limitation, the client workload can be characterized in a number of useful ways, including as follows: sequential v. random accesses; identification of hot data v. cold data; the use of NVMe namespaces; the locality of data accesses, both logically and physically; big v. small data transfers; queue depths; instant v. historical accesses; write dominated v. read dominated accesses, and so on.

The characterization of the workload is forwarded to one or more ratio generator circuits including a read ratio circuit 258, a write ratio circuit 260, a read/write ratio circuit 262, and a hardware allocation circuit 264. These circuits respectively implement the appropriate read, write and read/write ratios for the detected workload, as well as schedule the allocation of necessary hardware elements, such as buffers, to support the various commands.

Each of the respective ratios may be selected in a similar manner or in a different manner. For reads, priority may be given to client reads over GC and map update reads on the basis that read commands from the client cannot generally be delayed. Caching strategies can help if read commands are issued for pending data (read or write) in the local memory 140. However, if the requested read data needs to be returned from the flash memory 170, the reads will be given priority.

In a write dominated environment, GC reads may be given greater priority on the basis that a higher number of GC operations may be required in order to maintain sufficient available memory to accommodate the new write data. As noted above, GC reads generally need to occur before GC writes. However, GC operations may also need to be accelerated in a highly repetitive read dominated environment to relocate data due to read disturb and other effects.

In some embodiments, the read ratio circuit 258 operates to select, over each of a succession of time intervals, a suitable ratio of client reads to background reads (e.g., GC reads, map reads). For example, over the next $R_{TOTAL}$ reads, a first subset $R_{CLIENT}$ will be client reads and a second subset $R_{BACK}$ will be background reads, as follows:

$$R_{TOTAL} = R_{CLIENT} + R_{BACK} \quad (1)$$

The background reads can further be subdivided as necessary into GC reads $R_{GC}$ and map reads $R_{MAP}$ as follows, with a suitable sub-ratio selected for each term:

$$R_{BACK} = R_{GC} + R_{MAP} \quad (2)$$

The reads may be interspersed during each interval to maintain a target command completion rate. In some cases, the SSD may return the data and delay the notification to the client that the requested read data is ready in order to further level load the command completion rates.

One factor that cannot be easily controlled by the read ratio circuit 258 is the rate at which additional efforts are necessary to recover the requested data. Normally each read command issued by the flash I/O scheduler 226 will result in a read operation in which the associated code words from the selected page(s) are returned and subjected to error correction code (ECC, such as LDPC) decoding. The actual command completion time for any given read command will include some variation as a result of the extent to which additional read recovery efforts are necessary (e.g., read retries, multiple iterations through the LDPC decoder using different reference voltage levels, application of different powers of ECC, the use of outercode, etc). Nevertheless, the proper mix and scheduling among the various types of reads will result in overall effective client performance management.

The write ratio circuit 260 can operate in a similar fashion to select an appropriate ratio of client writes $W_{CLIENT}$ and background writes $W_{BACK}$ (e.g., GC writes $W_{GC}$ and map update writes $W_{MAP}$) for each interval. In some cases, the GC write rate will be set in relation to the GC read rate since, as discussed above, these operations are related and the GC read is required to be completed before the corresponding GC write can be carried out. As such, total writes $W_{TOTAL}$ over a given interval can be expressed as follows:

$$W_{TOTAL} = W_{CLIENT} + W_{MAP} + W_{GC}(R_{GC}) \quad (3)$$

In some cases, the rate at which the GC operations are carried out ($GC_{RATE}$) can be a function of different workload types ($WORKLOAD_{TYPE}$), with a faster rate and a slower rate being selected under different conditions. This can be expressed as follows:

$$GC_{RATE} = f(WORKLOAD_{TYPE}) \quad (4)$$
$$= \text{faster, low } I/O, \text{ high } W, \text{ high } BER$$

= slower, high $R$, low $BER$

In this case, the faster rate may be a first threshold rate such as up to X % of the total available reads as GC reads in the situations such as relatively few I/O client commands being received, in a write dominated environment, in an environment where high observed bit errors (bit error rate, BER) are being encountered, and so on. The slower rate may be a second threshold rate such as down to Y % of the total available reads in situations where higher client reads are carried out, where relatively lower BER is observed, and so on. More than two levels can be used as desired.

Once the respective ratios of reads and writes have been selected, the read/write ratio circuit 262, which as noted above may be incorporated into the flash electronics, selects and implements the final ratio of reads and writes. Stated another way, the total access commands $C_{TOTAL}$ issued to the flash for execution over any given interval is the combination of the total read commands $R_{TOTAL}$ and the total write commands $W_{TOTAL}$, as follows:

$$C_{TOTAL} = R_{TOTAL} + W_{TOTAL} \quad (5)$$

The particular order and scheduling will be carried out, with different commands issued to different die/channel combinations as the respective hardware resources become available. It will be appreciated that the foregoing analysis and management operations can further be subdivided among different NVMe namespaces for different clients coupled to the storage device.

As noted above, client I/O response performance is measured and monitored and adjustments are adaptively made to maintain the response within acceptable limits, including predetermined limits such as depicted in FIG. 1B. The scheduling of the required hardware (e.g., buffers, dies, decoders, etc.) will follow from the selected commands. The selected ratios can be selected both based on changes in workload characterization as detected by further inputs to the system (e.g, from the client), as well as on the actual completion performance of the storage device as detected by the outputs to the system (e.g., back to the client).

The different workload types can be characterized in various ways, but all serve the purpose of enabling the SSD to estimate the current and future needs of the client, both short and long term.

As noted above, one example workload type may be a read dominated environment where a vast majority of the current (and/or anticipated) client commands are read commands. Since read commands require the requested data to be successfully returned (e.g., the client is waiting for the results), read commands are normally given higher priority over other commands. Read commands also do not tend to significantly impact the map metadata apart from the notation of read counts, the monitoring for read disturb (leading to a need to GC and relocate the data), etc.

A write dominated environment places different demands upon the system. On the one hand, there is some flexibility if writeback caching techniques are carried out, since the SSD can report the write command as having been completed while the data are still pending in a local write cache. On the other hand, writes tend to require a greater number of map metadata updates since forward pointers or other information needs to be captured to indicate the new location for the new write data blocks (as well as the marking of the older version blocks as stale). A write dominated environment may further require a faster rate of GC operations to clear out stale data to make sure there is sufficient capacity in the flash to accommodate the new data.

Other forms of workload characterization can also influence device operation. Logically sequential writes or reads generally result in the transfers of large sections of data with sequential logical addresses (e.g., LBAs), such as in a streaming application. This can provide localized access as well as opportunities for readahead caching, etc. Random writes and reads, on the other hand, may be scattered throughout the flash and require a different strategy. These workload types can be overlapping and are not necessarily mutually exclusive; for example, it is possible to have a write dominated sequential environment or a write dominated random environment, etc.

Figure 11:
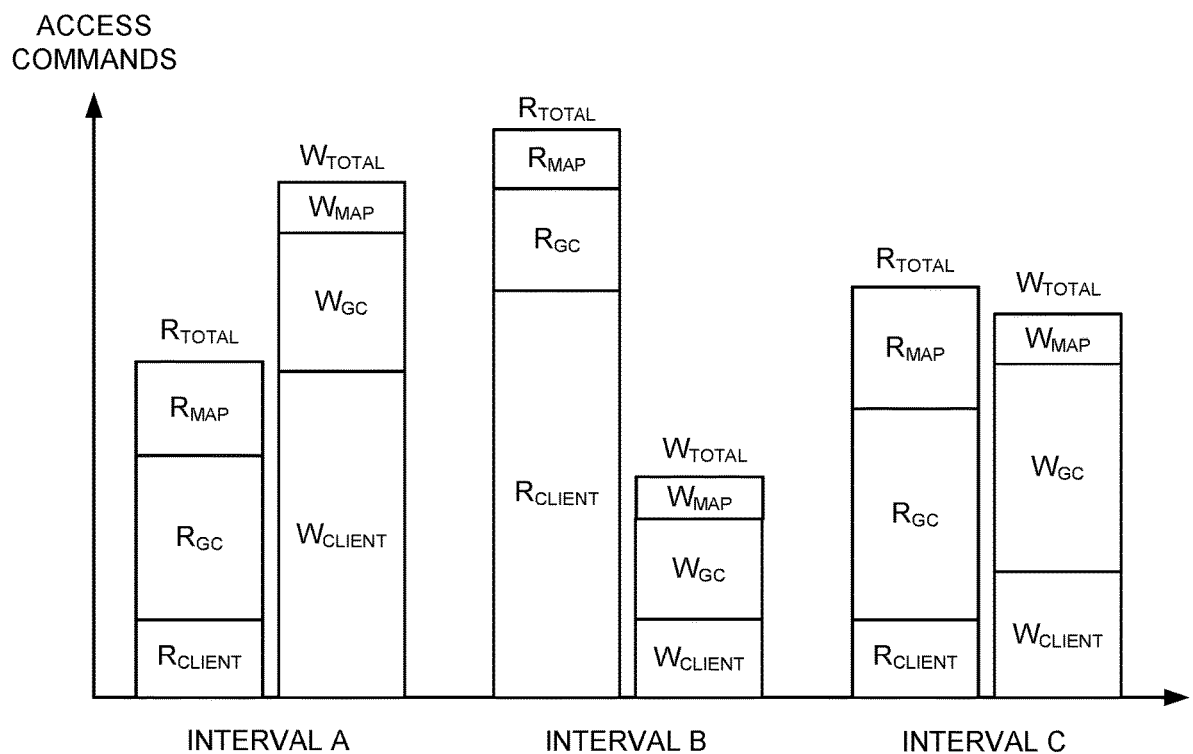
FIG. 11 is a graphical representation of different ratios during different intervals in which different workload types are presented to the SSD.

FIG. 11 is a graphical representation of three different intervals processed by the SSD 130 in some embodiments. The intervals are generically labeled as Intervals A-C. While the intervals could be immediately successive, for purposes of the present discussion it is contemplated that the intervals occur at different times under different workload type conditions.

Interval A can be characterized as a primarily write dominated environment, with a relatively large ratio of client writes to client reads. Suitable ratios are selected among each of the respective reads and writes, as well as between the final mix of writes to reads, to maintain the desired client performance level. It will be noted that a larger number of GC reads are scheduled as compared to GC writes. This may be because in some embodiments GC reads are carried out in a first interval and the corresponding GC writes are not scheduled until the next interval, so roughly, the number of GC writes will follow the number of GC reads in a downstream fashion. However, this is not necessarily required; so long as the timing is controlled such that the GC reads complete before the GC writes, GC read/write pairs can be executed within the same time interval.

Interval B can be characterized as a primarily read dominated environment, so that the client is issuing a significantly greater number of client reads as compared to client writes. As before, the demands of the system will dictate the number and nature of the background reads and writes necessary to support the client reads (and, as necessary, the client writes).

Interval C can be characterized as a relatively low I/O workload, which can happen from time to time even in an enterprise environment where the client is not currently issuing commands at a high rate. In this case, as described above the system will take advantage of the opportunity to perform background operations at a higher relative rate while maintaining the client performance at the same completion rate level (however measured) irrespective of the volume of commands being issued by the client.

Figure 12:
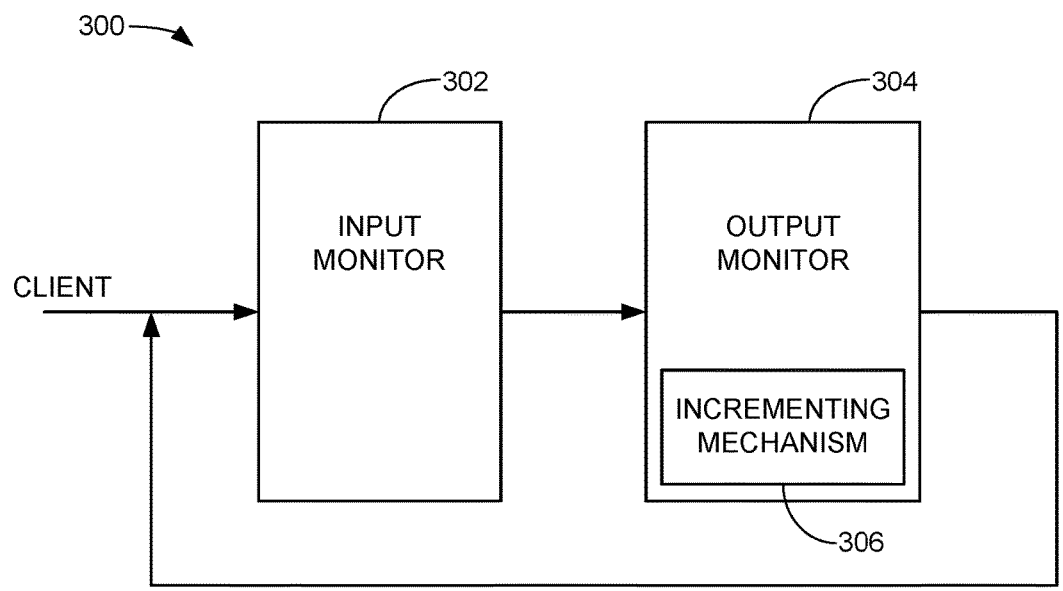
FIG. 12 shows monitor circuitry of the SSD in further embodiments.

FIG. 12 is a simplified functional diagram of a monitor circuit 300 of the SSD 130 in further embodiments. As before, the monitor circuit 300 can be incorporated as part of the controller functionality and can form a portion of, or work in conjunction with, the other circuits discussed above.

An input monitor 302 generally operates to detect and track the input side of the system, such as by monitoring the rate, style and type of client I/O access commands being issued to the SSD. An output monitor 304 similarly operates to detect and track the output side of the system, such as by monitoring command completion rates and/or other parameters to evaluate the current system configuration.

As necessary, an incrementing mechanism 306 makes incremental adjustments (up or down) to the ratios in successive intervals to maintain the client response operation at the desired level. For smoothing purposes, a maximum amount of incremental change (such as 5% or some other value) can be allowed to the ratios from one interval to the next.

In further embodiments, the output monitor 304 can operate to adjust, such as by delaying by small amounts, the command completion times that are reported to the client at the conclusion of the client I/O access commands. As desired, the output monitor 304 can further operate, such as in response to a client command, to disable the compensation processing and allow the device to operate in a burst style mode (e.g., such as depicted in FIG. 1A). In this way, the system provides a closed loop control approach that adaptively reduces variation in client I/O response and reduces large variations as in existing art solutions, along with the capability to, when requested, to provide maximum throughput in the uncompensated mode.

While various embodiments presented herein have been described in the context of an SSD, it will be appreciated that the embodiments are not so limited, as other forms of storage devices such as hard disc drives (HDDs), hybrid data storage devices (HDSDs), etc. can be used as desired. It will be appreciated that HDDs tend to use rotatable magnetic recording media as the main memory store, and that HDSDs tend to use both rotatable magnetic recording media and solid state memory as the main memory store. The various embodiments have particularly suitability for use in an NVMe environment, including one that supports deterministic (IOD) modes of operation in which specified levels of performance are guaranteed for selected intervals.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method, comprising:
monitoring a rate at which client I/O access commands are provided from a client to transfer data between the client and a non-volatile memory (NVM) of a storage device; and
adjusting a ratio of controller-generated background access commands to the client-generated I/O access commands to maintain completion rates of the client-generated I/O access commands at a predetermined level, the controller-generated background access commands including garbage collection (GC) read commands to retrieve current version data blocks from a first garbage collection unit (GCU) and GC write commands to subsequently store the retrieved current version data blocks in a second GCU while the first GCU is erased, wherein a rate at which the GC write commands are carried out is selected as a function of the GC read commands, and a rate at which the GC read commands are carried out is selected as a function of a detected type of workload presented to the storage device by the client, to prepare the storage device to service the client-generated I/O access commands, the controller-generated background access commands comprise garbage collection (GC) read commands to retrieve current version data blocks from a first garbage collection unit (GCU) and GC write commands to subsequently store the retrieved current version data blocks in a second GCU while the first GCU is erased, a rate at which the GC write commands are carried out is selected as a function of the GC read commands, and a rate at which the GC read commands are carried out is selected as a function of a detected type of workload presented to the storage device by the client.

2. The method of claim 1, wherein the adjusting step comprises using an incrementing mechanism to adjust a first number of the background access commands and a second number of the client I/O access commands to execute over each of a succession of time intervals to maintain the completion rates at the predetermined level.

3. The method of claim 1, wherein the background access commands comprise internal read and write commands to carry out garbage collection operations, wherein the client I/O access commands comprise client read and write commands to transfer data from and to the NVM, and wherein the adjusting step comprises selecting a first ratio of the internal read commands to the client read commands, a second ratio of the internal write commands to the client write commands, and a third ratio of total read commands to total write commands.

4. The method of claim 3, wherein the background access commands further comprise internal read and write commands to carry out metadata map updates to describe client data stored to the NVM.

5. The method of claim 1, further comprising accumulating history data associated with the client I/O access commands issued to the storage device from the client, identifying a workload type in relation to the accumulated history data, and adjusting the ratio in relation to the identified workload type.

6. The method of claim 5, wherein the detected workload is at least a selected one of a write dominated environment, a read dominated environment, a sequential access environment or a random access environment.

7. The method of claim 1, wherein the storage device is characterized as a solid-state drive (SSD) and the NVM is characterized as NAND flash memory.

8. The method of claim 1, wherein the predetermined level of the completion rates maintained by the adjustment of the ratio of background access commands to the client I/O access commands comprises an upper specified threshold and a lower specified threshold, and the completion rates are maintained between the upper and lower specified thresholds.

9. The method of claim 1, wherein a first ratio is selected for a first interval during which first access commands are executed to transfer data with the NVM, and wherein an incrementing mechanism adjusts the first ratio to use a different, second ratio during an immediately successive second interval during which second access commands are executed to transfer data with the NVM, the incrementing mechanism limiting a difference interval between the first ratio and the second ratio by a maximum predetermined amount to apply a smoothing function to the completion rates.

10. The method of claim 1, further comprising disabling the adjusting of the ratio to operate in an uncompensated mode in which variation in the completion rates exceeds the predetermined level.

11. A storage device, comprising:
a non-volatile memory (NVM);
a controller configured to transfer data between the NVM and a client responsive to client-generated I/O access commands supplied to the storage device by the client, and further configured to generate background access commands including garbage collection (GC) read commands to retrieve current version data blocks from a first garbage collection unit (GCU) and GC write commands to subsequently store the retrieved current version data blocks in a second GCU while the first GCU is erased; and a command scheduler circuit configured to monitor a rate at which the client-generated I/O access commands are provided from the client, to identify a workload type responsive to the client-generated I/O access commands, and to adjust a ratio of controller-generated background access commands wherein a rate at which the GC write commands are carried out is selected as a function of the GC read commands, and a rate at which the GC read commands are carried out is selected as a function of the detected workload type presented to the storage device by the client, to maintain completion rates of the client-generated /o access commands at a predetermined level, the controller-generated background access commands comprise garbage collection (GC) read commands to retrieve current version data blocks from a first garbage collection unit (GCU) and GC write commands to subsequently store the retrieved current version data blocks in a second GCU while the first GCU is erased, a rate at which the GC write commands are carried out is selected as a function of the GC read commands, and a rate at which the GC read commands are carried out is selected as a function of a detected type of workload presented to the storage device by the client.

12. The storage device of claim 11, wherein the client I/O access commands comprise client read and write commands to transfer data between the client and the NVM, and wherein the background access commands comprise internal reads and writes to transfer data internally with the NVM to prepare the storage device to service the client read and write commands.

13. The storage device of claim 12, wherein the command scheduler circuit selects a first ratio of the internal read commands to the client read commands, a second ratio of the internal write commands to the client write commands, and a third ratio of total read commands to total write commands.

14. The storage device of claim 12, wherein the internal read and write commands are carried out for garbage collection operations to relocate current version data blocks in the NVM and for metadata to describe client data stored to the NVM.

15. The storage device of claim 11, wherein the detected workload is at least a selected one of a write dominated environment, a read dominated environment, a sequential access environment or a random access environment.

16. The storage device of claim 11, wherein the predetermined level of the completion rates maintained by the adjustment of the ratio of background access commands to the client I/O access commands comprises an upper specified threshold and a lower specified threshold, and the command scheduler circuit further successively adjusts the ratio to maintain the completion rates between the upper and lower specified thresholds.

17. The storage device of claim 11, wherein the command scheduler circuit further operates to add a delay at the completion of at least some of the client I/O accesses prior to providing a notification to the client that the associated at least some of the client I/O accesses have been completed to further maintain the completion rate within the predetermined level.

18. A system comprising a client device and a storage device coupled to the client device, the storage device comprising a controller circuit, a non-volatile memory (NVM) and a command scheduler circuit, the command scheduler circuit configured to maintain a completion rate of client-generated I/O access commands issued by the client device to the storage device within a predetermined range by monitoring a rate at which the client-generated I/0 access commands are provided from the client, by identifying a workload type responsive to the client-generated I/O access commands, and by adjusting controller-generated background access commands including garbage collection (GC) read commands to retrieve current version data blocks from a first garbage collection unit (GCU) and GC write commands to subsequently store the retrieved current version data blocks in a second GCU while the first GCU is erased, wherein a rate at which the GC write commands are carried out is selected as a function of the GC read commands, and a rate at which the GC read commands are carried out is selected as a function of a detected type of workload presented to the storage device by the client.

19. The system of claim 18, wherein the storage device comprises a selected one of a solid-state drive (SSD), a hard disc drive (HDD) or a hybrid data storage device (HDSD).

* * * * *